United States Patent [19]

Duvekot

[11] 4,083,090

[45] Apr. 11, 1978

[54] NON-MARKING SEAM IN SCREEN USED FOR MANUFACTURE OF NONWOVEN FABRIC

[75] Inventor: Theodore Duvekot, Wilmington, Del.

[73] Assignee: E. I. Du Pont de Nemours and Company, Wilmington, Del.

[21] Appl. No.: 685,151

[22] Filed: May 11, 1976

[51] Int. Cl.² ............................................. B21F 27/10
[52] U.S. Cl. ........................................ 28/104; 28/106; 28/141; 140/111; 228/178; 245/10
[58] Field of Search .................. 228/173 E, 178, 182; 245/10; 140/111, 112; 19/161 P; 28/104, 106, 141

[56] References Cited

U.S. PATENT DOCUMENTS

| 1,949,593 | 3/1934 | Weissenborn et al. | 245/10 |
| 2,893,664 | 7/1959 | Gerhauser | 245/10 |
| 3,366,355 | 1/1968 | Haller | 245/10 |
| 3,555,665 | 1/1971 | Kelley, Jr. | 245/10 X |
| 3,622,415 | 11/1971 | Kunsman | 245/10 X |
| 3,681,183 | 8/1972 | Kalwaites | 19/161 P |

FOREIGN PATENT DOCUMENTS

R11,073  6/1956  Germany ............................. 245/10

Primary Examiner—Al Lawrence Smith
Assistant Examiner—K. J. Ramsey

[57] ABSTRACT

A seam of two ends of a rigid screen of interwoven longitudinal and transverse wires is made by butting and fusing together longitudinal wire ends at each end of the screen at the crossovers of the longitudinal wire ends with an adjacent pair of transverse wires forming the seam in one surface of the screen, whereby the seam is not visible from the opposite surface of the screen.

6 Claims, 5 Drawing Figures

NON-MARKING SEAM IN SCREEN USED FOR MANUFACTURE OF NONWOVEN FABRIC

BACKGROUND OF THE INVENTION

This invention is directed to a process for forming a seam of two ends of rigid screen, to the resultant closed-loop screen, and to a process of using the resultant closed-loop screen.

It is a known process to treat a fibrous web such as of textile fibers with streams of fluid while the web is supported on a screen surface to convert the fibrous web to a nonwoven textile fabric. In one such process, the screen is medium fine (30 mesh, about 12 wires/cm) to coarse and consists of longitudinal wires interwoven with transverse wires. The fabric formed on the screen conforms to the topography of the surface of the screen. In a preferred process wherein the streams are fine columnar streams of liquid, apertures are formed in the fabric at locations corresponding to the knuckles of the interwoven wires of the screen. The apertures in the fabric are bounded by regions of fiber concentration corresponding to the apertures in the screen and these regions are interconnected by groups of fibers curving over and along the surface of the wires of the screen. In order for the process of converting web to fabric to be continuous, the screen has been formed into a closed loop which is rotated beneath the fluid treatment zone. Heretofore, the closed loop was formed by welding the opposite ends of a length of screen together to form a seam. Unfortunately, the resultant seam had a topography which differed from that of the remainder of the screen and caused a defect in the fabric with each revolution of the screen loop.

Various methods for making seams in Fourdrinier screens in the papermaking art have been disclosed. These methods are not applicable to solving the above-described problem, however, because such methods change the topography of the screen and/or have required flexible, manually interweavable longitudinal transverse wires to make the seam. The screen used in the fluid treatment process described above is rigid in the sense that its wires are too stiff to be manually interwoven into a seam without producing a seam of changed topography.

For example, U.S. Pat. No. 2,893,664 discloses cutting the warp wires of the screen so that all warp (longitudinal) wires protrude from their respective shute (transverse) wire at opposite ends of a length of screen, and soldering these warp wires to opposite sides of a solderable thread. This seam produces a change in the topography of the surface of the screen.

U.S. Pat. Nos. 3,366,355, 3,552,691, and 3,596,858 and German Patent Application No. R 11,073, published June 21, 1956 all disclose forming a seam extending over a large number of shute wires by manual interweaving warp wires with these shute wires. For example, in U.S. Pat. No. 3,366,355, warp wires are joined together at three staggered locations (three-warp pattern) across a seam that is seventeen weft wires wide (FIG. 4). Fourdrinier screens are normally a fine screen, i.e., 55 mesh (about 22 wires/cm), and finer; this patent does disclose, however, a 16 mesh screen (about 6 wires/cm), which is manually interweavable by virtue of the screen being made of plastic filaments.

U.S. Pat. No. 3,552,691 discloses an extension of this approach in which the joints between warp wires are staggered at greater than three locations such as a 4, 5, 6, or 7-warp pattern, across the width of the seam comprising, for example, 64 manually interwoven shute wires (FIG. 9). The warp wires may be butted together either at an intersection with a seam weft (shute) or in the space between seam wefts, and the butted warp ends need not be joined together (column 4, lines 8–12).

In still a later development, U.S. Pat. No. 3,596,858 continues the manual interweaving approach to form a seam, wherein the seam can have a width of 13 shute wires (FIG. 2), and the joint is in a five-warp pattern, with one end of each warp wire in the seam lying beneath a shute wire and the opposing ends of each warp wire in the seam either being spaced apart (FIG. 3) or abutting (FIG. 9). No joining together of abutting warp ends is disclosed. The improvement disclosed in this patent is the provision of more effective drainage of the water through the Fourdrinier screen and reduced marking of the paper made on the screen.

German Patent Application No. R 11,073, published June 21, 1956, discloses the making of a seam in which opposing protruding warp wires from opposite ends of a screen are interwoven with seven auxiliary weft wires as shown in FIG. 1. The opposing ends of the warp wires form a staggered joint across the width of the seam and are overlapped at locations between weft wires and thereafter fused to form enlarged joints.

SUMMARY OF THE INVENTION

The present invention provides a screen seam which can be made by the screen user and which does not change the topography of at least one surface of the screen, whereby apertured nonwoven fabric formed by fluid treatment of a fibrous web on this screen surface does not show the presence of the seam in the screen.

More specifically, one aspect of the present invention is a process for seaming into a closed loop a screen composed of longitudinal wires and transverse wires interwoven with said longitudinal wires, the frequency of each said wires in said screen being no greater than 12 wires/cm, comprising (a) cutting said longitudinal wires to a length corresponding to the circumference desired for said loop, said cutting of said longitudinal wires at each end of said screen being such that (i) the ends of the longitudinal wires at each end of said length of screen can be butted together, (ii) there is one of said transverse wires at each end of said length of screen, which wires become an adjacent pair of transverse wires upon the butting together, and (iii) the butting together occurs at the crossovers of said ends of said longitudinal wires with said adjacent pair of transverse wires in one surface of said screen, whereby the butting together of said longitudinal wires is not visible from the opposite surface of said screen, (b) butting together the ends of the longtiudinal wires of each end of said length of screen to thereby form said length of screen into a closed loop, and (c) forming a seam of the butted ends of said longitudinal wires in said one surface of said screen which is not visible in the opposite surface of said screen by fusing said butted ends together.

Another aspect of the present invention is the resultant seamed screen product, namely, a screen having its ends joined together by a seam, the screen comprising longitudinal wires interwoven with transverse wires, the frequency of each of said wires in said screen being no greater than 12 wires/cm, said seam comprising an adjacent pair of transverse wires and the longitudinal wires butted end-to-end and fused together at the crossovers of the ends of the longitudinal with said adjacent pair of transverse wires in one surface of said screen.

DESCRIPTION OF THE DRAWINGS

The invention will be further described hereinafter with reference to the drawings in which.

DETAILED DESCRIPTION OF THE PRESENT INVENTION

Figure 1:
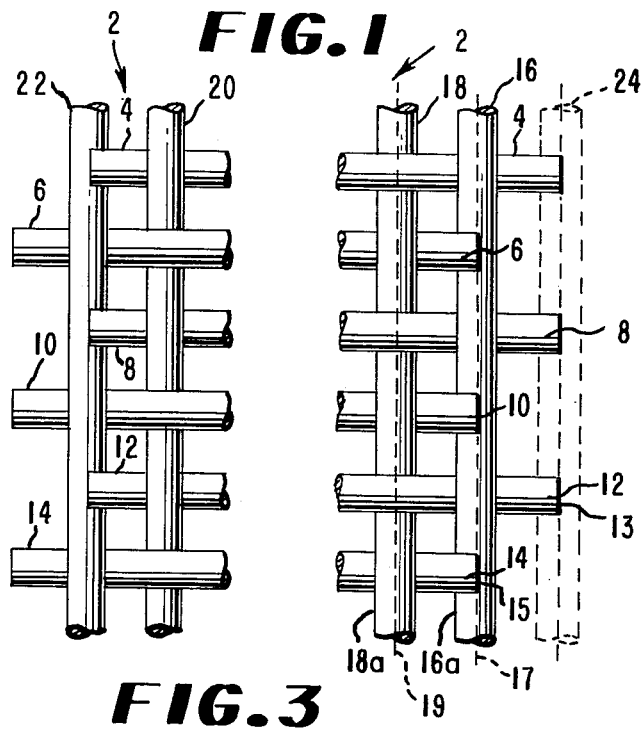
FIG. 1 shows in enlargement a plan view of the surface to be seamed of an indeterminate length of screen, with the warp wires cut in preparation for making a seam of the present invention.

FIG. 1 shows a screen 2 of longitudinal wires 4, 6, 8, 10, 12, 14 running from end to end of the screen, the longitudinal wires being interwoven with transverse wires 16, 18, 20, and 22. The terms "longitudinal" and "transverse" refer to the different directions of the wire in the screen and are not necessarily related to the warp and shute wire directions in the manufacture of the screen. The screen seam of the present invention can be made by fusing the screen wires butted together shute to shute or warp to warp. For simplicity, however, the wires described herein as being butted together and fused into a seam are called the longitudinal wires of the screen.

The first step of the process of the present invention is to cut each of the longitudinal wires to a length corresponding to the circumference desired for the loop to be formed from the screen.

In the particular screen pattern shown in FIG. 1, which is a plain weave pattern, this cutting step involves cutting longitudinal wires 4, 8, and 12 which cross over the top of the transverse wire 16 at the right-hand end of the screen so that the ends of such longitudinal wires protrude equidistantly from the transverse wire 16 at this end of the screen such that the longitudinal wire ends would be at the crossover of the next transverse wire 24 (imaginary) in the screen pattern if such transverse wire were present. Intervening longitudinal wires 6, 10, and 14 are cut along a straight line so that their ends are at the crossover with the transverse wire 16.

The longitudinal wires at the left-hand end of the screen shown in FIG. 1 are similarly cut except that the pattern of cut ends is complementary to the right-hand end of the screen, i.e., the left-hand ends of longitudinal wires 6, 10, 14 are the protruding ends and the left-hand ends of longitudinal wires 4, 8, and 12 are at the crossover with the transverse wire 22 at the left-hand end of the screen.

Figure 2:
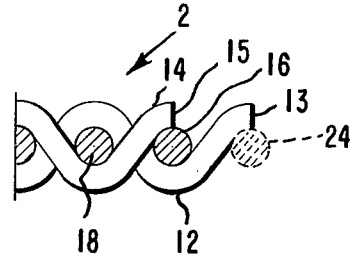
FIG. 2 shows a side view of one end of the screen of FIG. 1.

FIG. 2 shows the side view of the right-hand end of the screen after this cutting. The end 15 of the longitudinal wire 14, representing all the intervening longitudinal wires at this screen end, is at the crossover of this longitudinal wire with transverse wire 16, and is shown in the drawing as being on top of the transverse wire. The warp wire 12, representing all the other longitudinal wires at this screen end, passes beneath transverse wire 16, and the end 13 of the longitudinal wire 12 is at the intersection with the imaginary transverse wire 24. It will be noted that the longitudinal wire ends 13 and 15 are both in one surface of the screen, i.e., the top surface shown in FIG. 2. The longitudinal wires at the opposite screen end terminate in the same screen surface.

The cutting of the longitudinal wires is done by precision cutting equipment, an example of which is a dental drill. This tool is especially useful for cutting the longitudinal wires such as wire 14 in FIG. 2 that terminate at the crossover ends with a transverse wire. The cutting can be done with accuracy and precision of at least ±0.05 mm by measuring the distance the longitudinal wire is to be cut back from the preceeding transverse wire as a reference surface. For example, the back side 16a of transverse wire 16 would be the reference surface from which to determine the line along which longitudinal wires 4, 8, and 12 terminate, and the back side 18a of transverse wire 18 would be the reference surface from which to measure where longitudinal wires 6, 10, and 14 terminate.

Preferably, the longitudinal wire ends that protrude from a transverse wire at a screen end terminate at a distance from the centerline of the transverse wire that corresponds to the distance between centerlines 17 and 19 of adjacent transverse wires such as transverse wires 16 and 18 in the screen. Also, preferably, the intervening longitudinal wire ends, represented as end 15 in FIG. 2, terminate along the centerline 17 of the transverse wire, such as transverse wire 16, at the end of the screen. The opposite end of the screen is, of course, complementally cut.

Figure 3:
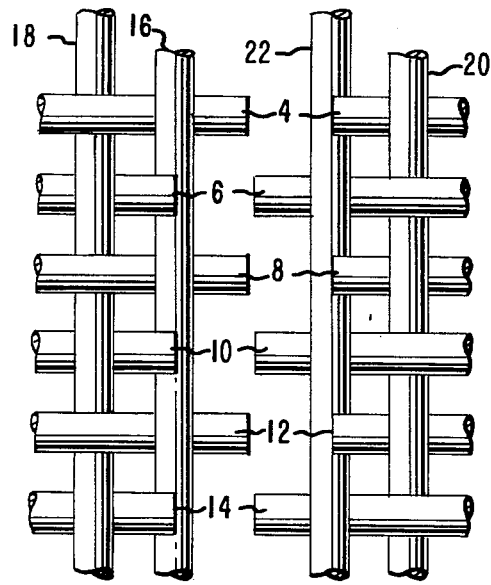
FIG. 3 shows a plan view of the ends of the screen of FIG. 1 being brought together to form a closed loop of the screen.
Figure 4:
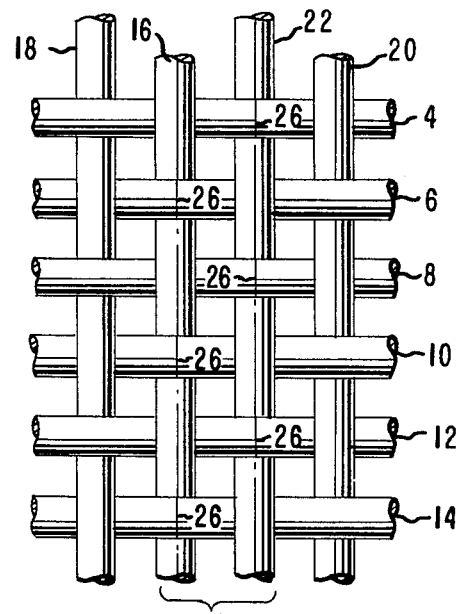
FIG. 4 shows the seamed side of the screen of FIG. 1 with the warp wires at the ends of the screen abutted and fused together.

The next step of the process of the present invention is to form the cut screen into a closed loop by bringing the ends shown in FIG. 1 together as shown in sequence in FIGS. 3 and 4. The complementary cutting of the longitudinal wires at each end of the screen enables the wires to interfit as shown in FIG. 3 and butt together as shown in FIG. 4.

The seam 28 formed by the abutting longitudinal wire ends is stabilized by fusing the abutting ends together, such as by welding, brazing or soldering or other method involving heating as will be known to one skilled in the art, depending on the particular material of construction of the screen. Heli-arc welding is preferred for the coarse wire in screens 14 mesh (about 6 wires/cm) and coarser, and brazing is preferred for the finer wires in the screens of 14 to 30 mesh (6 to 12 wires/cm). The fused joints between the abutting ends are shown at 26 in FIG. 4. It is not necessary that the longitudinal wire ends also be fused to their respective transverse wire, and by avoiding such fusion, the resultant seam has a flexibility that is similar to that of the remainder of the screen.

From FIG. 4 which shows the seamed side of the screen, it can be seen that the resultant seam consists of a pair of adjacent transverse wires, such as wires 16 and 22, and all the joints between the abutting longitudinal wire ends are at crossovers with one or the other of these transverse wires in one surface of the screen.

Viewing the screen of FIG. 4 from the opposite surface, one does not see any ends of longitudinal wires. Only apparently continuous longitudinal wires and a continuation of the pattern of spacing between transverse wires on both sides of the seam are visible. The seam is invisible from this opposite screen surface in the sense that the topography across the two adjacent transverse wires comprising the width of the seam is a continuation of the topography on both sides of the seam. The only indication of the presence of the seam from this opposite screen surface may be a linear discoloration resulting from the heating involved in the step of fusing the abutting warp wire ends together. Of course, the fusion step should not involve such a buildup of metal that the joint between abutting longitudinal wire ends is visible from said opposite screen surface. If the fusing is done with sufficient care and/or sufficient polishing of the fused joints is done the seam on the seamed side of the screen also has a topography which is a continuation of the topography of the screen on both sides of the seam.

The screen used in the present invention is a rigid screen in the sense that the combination of the material of construction and thickness of the wires making up the screen make the wires too stiff to be manually interwoven to produce a seam topography which is a continuation of the topography on both sides of the seam. The screen size runs from 30 mesh (about 12 wires/cm) and coarser, and the wires of the screen are preferably made of metal. Typically, the screen will be at least 4 mesh (about 2 wires/cm). Preferred screens are 4 to 10 mesh (about 2 to 4 wires/cm). The transverse and longitudinal wires can be round in cross section or can have some other cross-sectional shape, such as half round and rectangular, and such wires will generally have a cross-sectional measurement of at least 0.5 mm in at least one direction of the cross section and preferably at least 0.8 mm.

Instead of the plain weave screen pattern shown in the drawings, other screen patterns can be used such as a twill weave pattern wherein the repeat unit is that each transverse wire passes over two adjacent longitudinal wires and then under two adjacent longitudinal wires; the adjacent transverse wires alternate, in this respect, i.e., pass under and over, respectively, these adjacent longitudinal wires. To apply the principle of the present invention to this pattern, alternating pairs of adjacent longitudinal wires would be cut to terminate at the crossover with the transverse wire at the end of the screen and the intervening adjacent pairs of longitudinal wires would be cut to protrude the appropriate distance from the transverse wire and terminate in the same screen surface as the ends of the other pairs of adjacent longitudinal wires. The longitudinal wires at the opposite end of the screen would be complementarily cut, so that the screen ends interfit and all longitudinal wires abut their opposite ends in the same screen surface when the screen ends are brought together.

By way of example, an 8-mesh plain weave wire screen of bronze transverse and longitudinal wires, each spaced 8 per inch (3.1 per cm) and having a diameter of 0.063 inch (1.6 mm) is prepared for seaming by cutting the longitudinal wires in a straight line to the approximate length desired. Every other longitudinal wire extending from its respective transverse wire is then cut back to the centerline of the transverse wire at the end of the screen, and the remaining wires are cut back to terminate along a line spaced from the centerline of the transverse wire by the distance between centerlines of an adjacent pair of transverse wires at the end of the screen. The cutting at each end of the screen is complementary and when the cutting is finished, each longitudinal wire is at the length corresponding to the circumference desired for the closed loop of the screen. The cutting is done using a high-speed dental drill, until a measurement with a dial gauge-equipped slide caliper using reference surfaces such as 16$a$ and 18$a$ shown in FIG. 1 indicates that the longitudinal wire end is in the right place. The high speed dental drill used is a Starflite Futura handpiece, Model No. F201 and is equipped with carbide burrs (SS White FG37 and 37L) and it is operated with a 2.8 kg/cm$^2$ air pressure (gauge) and cooled with water-soluble cutting oil. After the longitudinal wires at both screen edges are cut, the ends of the screen are brought together so that the longitudinal wires interfit and butt against each other as shown in FIG. 4. The longitudinal wires are seamed by heli-arc welding, i.e., by striking an arc with a tungsten carbide electrode at the longitudinal wire joints and fusing the butting wire ends together while scavenging the welding zone with an inert gas such as argon or helium. The seam is not visible from the opposite side of the screen.

This same procedure can be used, for example, to seam 8-mesh stainless steel, 18-mesh bronze, and 24-mesh bronze screens into a closed loop.

EXAMPLE

An 8-mesh plain weave wire screen of bronze transverse wires and longitudinal wires, each spaced 8 per inch (0.31 per mm) and having a diameter of 0.063 inch (1.6 mm) is prepared for seaming by cutting the longitudinal wires to the length desired wherein all the longitudinal wire ends are all extended from their respective transverse wires at each end of the screen by a distance equal to the centerline distance between transverse wires in the screen. Every other longitudinal end is then drilled back using a high speed dental drill, until a measurement with a dial gauge equipped with a slide caliper indicates that the longitudinal wire end is located exactly under the centerline of its respective transverse wire at each end of the screen to form the longitudinal end pattern shown in FIG. 1. The high speed dental drill used is a Starflite Futura handpiece, Model No. F201 and is equipped with carbide burrs (SS White FG37 and 37L) and it is operated with a 2.8 kg/cm$^2$ (40 psi) air pressure (gauge) and cooled with water-soluble cutting oil. After the longitudinal wires at both screen edges are precision machined, the edges are brought together so that the longitudinal wires butt against each other, alternately under the end transverse wires as shown in FIG. 4. The longitudinal wires are seamed by heli-arc welding, i.e., by striking an arc with a tungsten carbide electrode at the longitudinal wire joints and fusing the butting wire ends together while scavenging the welding zone with an inert gas such as argon or helium. The seam is not visible from the opposite side of the screen.

In the above-described example, the longitudinal wires correspond to the warp wires of the screen and the transverse wires correspond to the shute wires of the screen. In another example, the shute wires are the longitudinal wires, i.e., the wires that are butted and fused together. More specifically, the screen is bronze and 24-mesh (about 9.5 wires/cm). The warp wires are the wires of major crimp and are flat, measuring 0.025 × 0.013 inch (0.635 × 0.33 mm) in cross section and the interwoven shute wires are round in cross section, measuring 0.02 inch (0.51 mm) in diameter. The screen has a 21% open area. The screen is prepared for seaming in the same manner as the preceding example except that it is the shute wires that are cut for butting together. The ends of the screen are brought together and seamed in one surface of the screen by brazing. The seam is not visible from the opposite surface of the screen.

Figure 5:
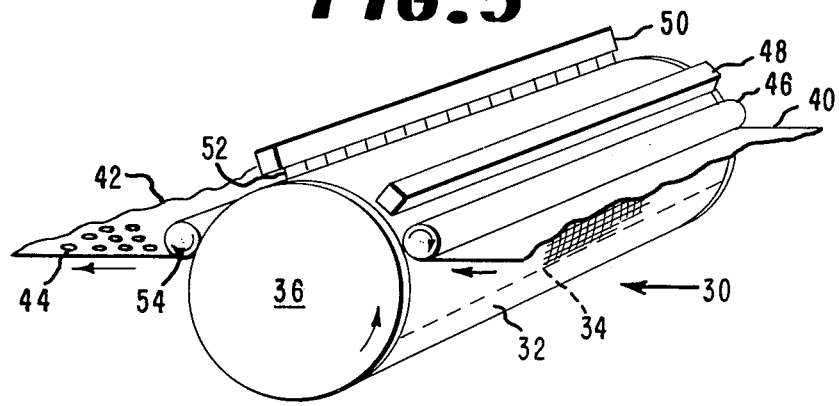
FIG. 5 shows in perspective a roll covered with a screen of the present invention used in fluid treatment process for converting a fibrous web to a nonwoven fabric.

One form of screen formed into a closed loop by the present invention is as a cover of a drum 30 as shown in FIG. 5, wherein the screen 32 has a seam 34 of the present invention like that shown in FIG. 4. The seam faces the interior of the drum 30. The drum has end rings 36 to hold the screen on the drum surface and is hollowed out (not shown) for communication of a vacuum with the underside of the screen 30. The screen can be formed and seamed into the closed-loop shape of the same or slightly larger diameter than the drum surface, and then the screen loop can be pulled onto the drum surface and clamped in place by the end rings. The drum can be rotatably mounted in conventional fashion. The screen loop of the present invention can also be used as a conveyor belt.

FIG. 5 also shows the use of the drum 30 in a fluid treatment process for converting fibrous web 40 into a nonwoven fabric 42 having a pattern of apertures 44 therein. The web 40 is fed onto the surface of the screen 32 through the nip between a guide roll 46 and screen-surfaced drum 30. Rotation of the drum is such that the web passes beneath two manifold banks 48 and 50 spaced about the circumference of the drum. From each of these banks issue streams 52 of liquid which impinge on the web to convert it to the apertured nonwoven fabric which leaves the drum after passing through the nip between it and guide roll 54. The longitudinal wires of the screen 32 run in the direction of rotation (machine direction) of the drum. The presence of seam 34 in the screen 32 is not detectable in the fabric.

Further details of the preferred fluid treatment process in which the fluid streams are fine columnar streams of liquid are disclosed in U.S. Pat. No. 3,485,706. In a specific embodiment, the fine columnar streams issue from orifices 5 mils (0.127 mm) in diameter and have a divergence angle of less than 5°, the fibrous web is a random web of 1.5 oz/yd$^2$ (50.85 g/m$^2$) area weight of polyester staple 1¼ inch (3.8 cm) long, and the screen is the screen of the first example disclosed hereinbefore. The orifice pressures of the streams are increased stepwise from 500 psi to 1500 psi (35 to 105 kg/cm$^2$), all pressures being gauge pressures until an apertured pattern of desired clarity is obtained. Instead of the single drum shown in FIG. 5, usually a series of such drums and fluid treatment of both sides of the web such as shown in FIG. 40 of U.S. Pat. No. 3,485,706 are used for continuous operation.

Since many different embodiments of the invention can be made without departing from the spirit and scope thereof, it is to be understood that the invention is not to be limited except to the extent defined in the following claims.

What is claimed is:

1. A process for seaming into a closed loop a rigid screen composed of longitudinal wires and transverse wires interwoven with said longitudinal wires, the frequency of each said wires in said screen being no greater than 12 wires/cm, comprising (a) cutting said longitudinal wires to a length corresponding to the circumference desired for said loop, said cutting of said longitudinal wires at each end of said screen being such that
      (i) the ends of the longitudinal wires at each end of said length of screen can be butted together,
      (ii) there is one of said transverse wires at each end of said length of screen, which wires become an adjacent pair of transverse wires upon the butting together, and
      (iii) the butting together occurs at the crossovers of said ends of said longitudinal wires with said adjacent pair of transverse wires in one surface of said screen, whereby the butting together of said longitudinal wires is not visible from the opposide surface of said screen,
   (b) butting together the ends of the longitudinal wires of each end of said length of screen to thereby form said length of screen into a closed loop, and
   (c) forming a seam of the butted ends of said longitudinal wires in said one surface of said screen which is not visible in the opposite surface of said screen by fusing said butted ends together.

2. A rigid screen having its ends joined together by a seam, the screen comprising longitudinal wires interwoven with transverse wires, the frequency of each said wires in said screen being no greater than 12 wires/cm, said seam comprising an adjacent pair of transverse wires and the longitudinal wires butted end-to-end and fused together at the crossovers of the ends of said longitudinal wires with said adjacent pair of transverse wires in one surface of said screen, whereby said seam is not visible from the opposite surface of said screen.

3. The screen of claim 2 wherein said longitudinal and transverse wires each have a cross section of at least 0.5 mm in at least one direction of their cross section.

4. The screen of claim 2 wherein said frequency is from 1.5 to 4 wires/cm.

5. In a process of impinging streams of fluid against a fibrous web supported on a rigid screen composed of longitudinal wires and transverse wires interwoven with said longitudinal wires passing beneath said streams to form an aperture patterned nonwoven fabric of said web, the longitudinal wires running in the direction of passage of said web beneath said streams and the screen being seamed into a closed loop, the improvement comprising conducting said impinging wherein said screen has its ends joined together by a seam, the screen comprising longitudinal wires interwoven with transverse wires, the frequency of each said wires in said screen being no greater than 12 wires/cm, said seam comprising an adjacent pair of transverse wires and the longitudinal wires butted end-to-end and fused together at the crossovers of the ends of said longitudinal wires with said adjacent pair of transverse wires in one surface of said screen, whereby said seam is not visible from the opposite surface of said screen and said web is supported on said screen, whereby the presence of said seam in said screen is not visible in the apertured pattern in said fabric.

6. In the process of claim 5 wherein said web is supported on the surface of said screen opposite from the surface in which said seam is present.

* * * * *